Dec. 9, 1969   G. L. HULSLANDER   3,482,619
AUTOMATIC CORE DISCHARGE CORE BLOWER
Filed Aug. 3, 1966   2 Sheets-Sheet 1
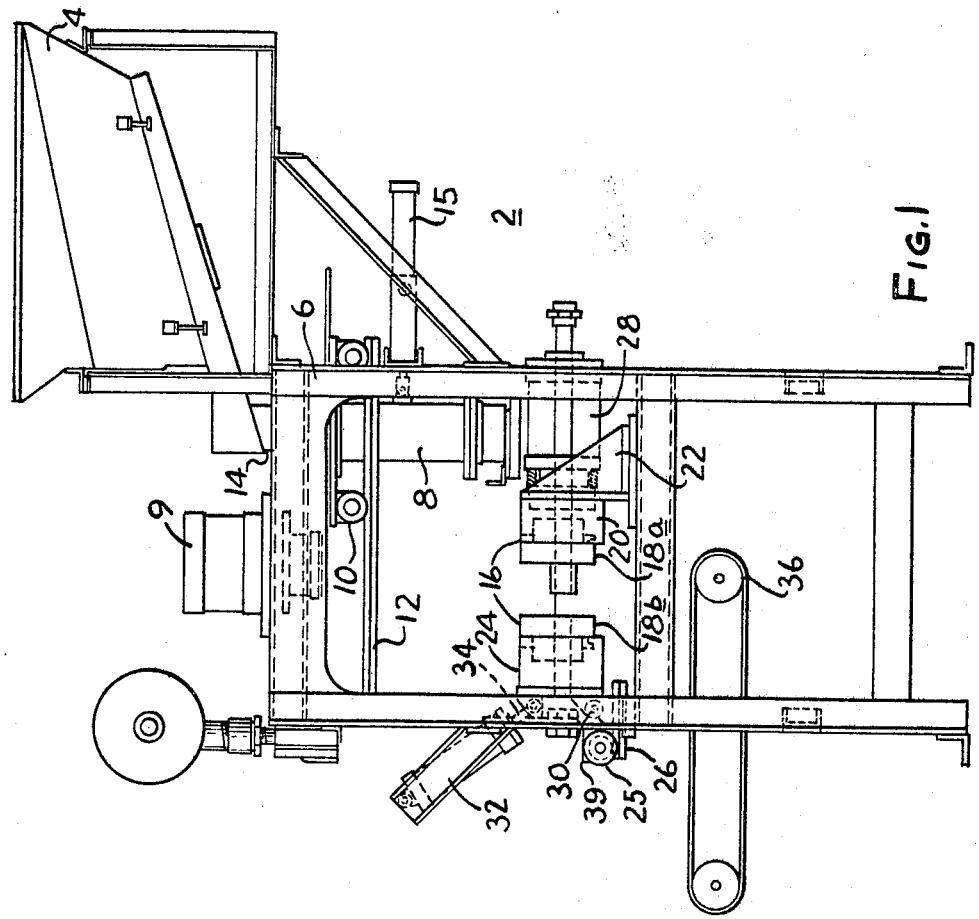
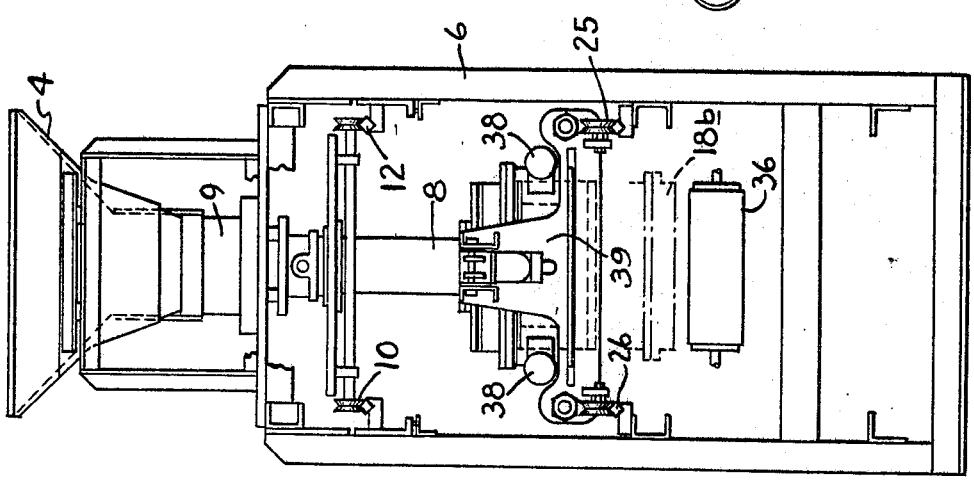
INVENTOR
GARY L. HULSLANDER
by: Mann, Brown & McWilliams
ATTYS Dec. 9, 1969  G. L. HULSLANDER  3,482,619
AUTOMATIC CORE DISCHARGE CORE BLOWER
Filed Aug. 3, 1966  2 Sheets-Sheet 2
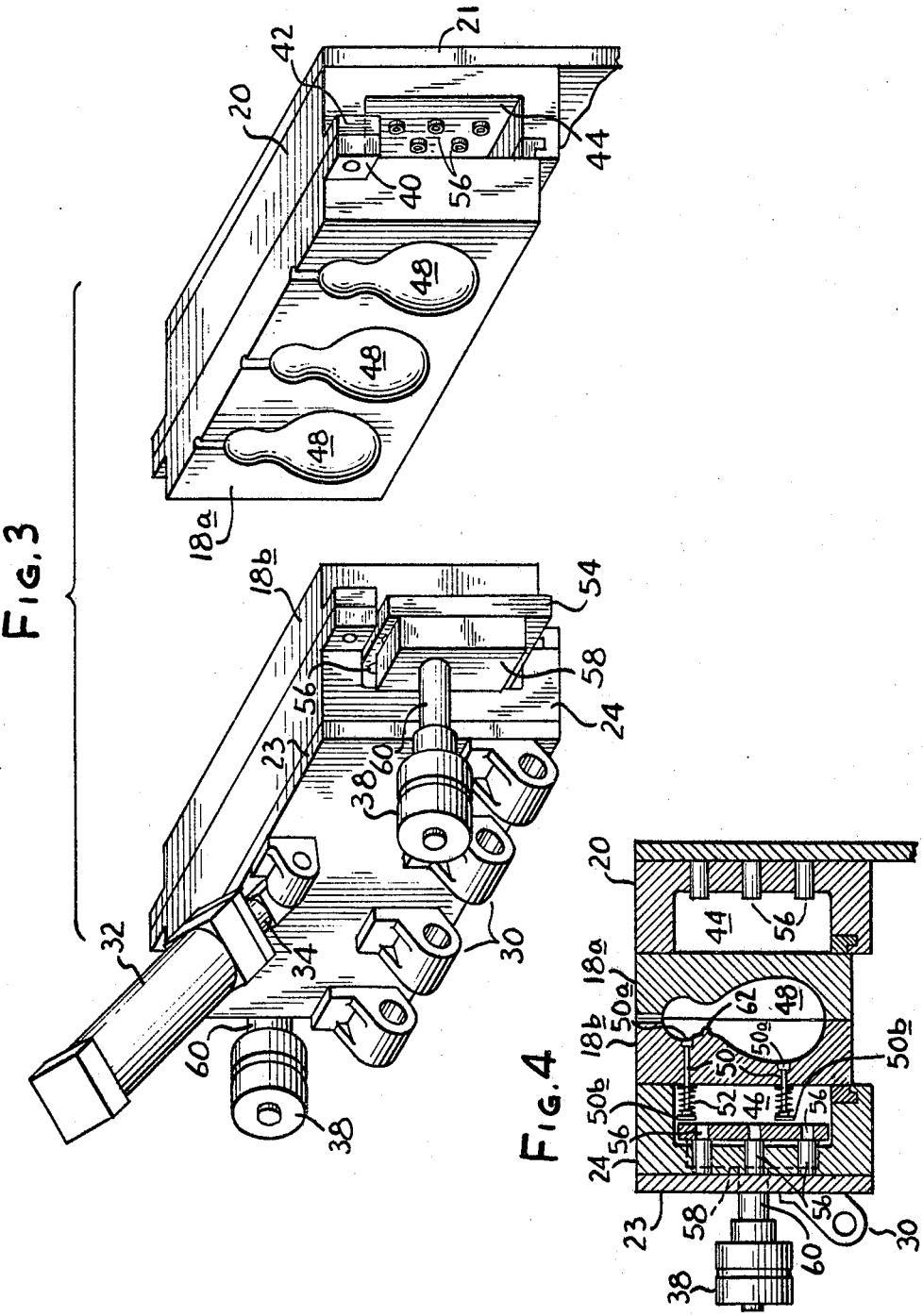
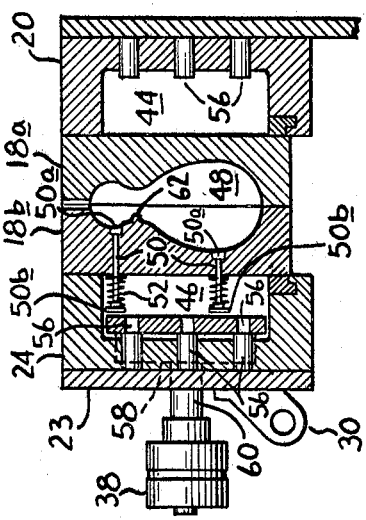
INVENTOR
GARY L. HULSLANDER
by: Mann, Brown & McWilliams
ATTYS.

United States Patent Office 3,482,619
Patented Dec. 9, 1969

3,482,619
AUTOMATIC CORE DISCHARGE CORE BLOWER
Gary L. Hulslander, Kewanee, Ill., assignor, by mesne assignments, to Acme-Cleveland Corporation, Cleveland, Ohio, a corporation of Ohio
Filed Aug. 3, 1966, Ser. No. 569,977
Int. Cl. B22c 15/24
U.S. Cl. 164—183                      11 Claims

ABSTRACT OF THE DISCLOSURE

The disclosure relates to a core blower having a horizontally reciprocating mold half to open and close the core box. When closed, a charge of molding sand or curable material is blown into the cavity of the core box. The sand is cured by suitable means, and then the mold halves separate, retaining the core in one of the mold halves which is then pivoted about 90 degrees to face downwardly. The core is then ejected by ejector pins to drop only a very short distance onto a soft conveyor, hence core breakage is eliminated. The foregoing abstract is merely a résumé of one general application, is not a complete discussion of all principles of operation or applications, and is not to be construed as a limitation on the scope of the claimed subject matter.

This invention relates to molding apparatus and more particularly relates to curable core box molding procedures and the means for effecting same.

In the prior molding art, it has been customary to utilize two mold halves and to place in the mold cavity formed by the mold halves a curable or moldable material such as sand, mixtures of sand containing binding materials, phenolic resins and other types of materials well known in the art. After the product or material had cured for a sufficient length of time, either through catalytic activity or through the application of heat, the mold halves were separated and then it was usually necessary to manually remove the molded article or to let the formed mold, article or core fall onto a receiving surface. Both of these methods have suffered in that the manual taking of the formed core from one of the mold halves required an undue labor expenditure or if the formed article or core were allowed to merely fall, needless damage was incurred thereby.

With the present apparatus, both of these difficulties are overcome and it is therefore, an object of this invention to provide a molding procedure and apparatus which elminates the necessity of manually retracting a formed core from a mold half.

Another object of this invention is to provide apparatus which can be operated automatically and which prevents the undue damaging of formed cores.

It is still a further object of this invention to provide a hot core box molding apparatus which accomplishes the above enumerated objectives economically effective and efficiently.

While the invention will be described as it pertains to a specific application thereof, it is to be understood that this is for illustrative purposes only and in on wise is to be considered as limiting the invention disclosed herein, which those of ordinary skill in the art will at once recognize as taking many different forms without detracting from the spirit of the invention disclosed especially when considering the hereinafter following commentary taken in conjunction with the drawings of which—

FIGURE 1 is a side elevational view of a common molding apparatus adapted to utilize the invention;

FIGURE 2 is an end view of the apparatus depicted in FIGURE 1,

FIGURE 3 is a fragmentary perspective view particularly depicting the invention in a specific embodiment showing the mold halves in conjunction with burner platens of a hot core box apparatus, and FIGURE 4 is a fragmentary side view of a novel mold construction using the invention.

Referring specifically to FIGURES 1 and 2 there is shown a molding apparatus 2, with some details omitted for clarity, having a moldable material or sand and binder feeder or hopper 4 supported on the framing 6 and a charge cylinder 8 reciprocally mounted on wheels 10 and track 12 for movement from the hopper funnel 14 to a central position of the molding apparatus 2. Cross head cylinder 15 provides the means of reciprocally positioning charge cylinder 8 over the mold cavity formed by the mold halves. The typical clamp cylinder 9 is depicted at the approximate center of the apparatus 2 to coincide with the axis of charge cylinder 8 and the mold cavity of core box 16. One-half of the core box 16 comprises stationary mold half 18a secured to burner platen 20 supported on triangular support 22. Movable and oppositely disposed mold half 18b secured to burner platen 24 is mounted on a movable support 39 for reciprocal rectilinear movement to and away from the center of apparatus 2 on wheels 25 resting on track 26 secured to the framing 6. Core box cylinder 28 effects movement of movable mold half 18b. Mold half 18b and burner platen 24 is pivotally mounted on hinge pin means 30 to facilitate rotational movement of mold half 18b through an arc of about 90 degrees from horizontal with the core box in the open position, as indicated in FIGURE 2 in phantom lines, by means of power cylinder 32 secured to the moving support 39 and having its piston rod 34 secured to the end portion of burner platen 24. Suitable ejector pins 50, FIGURE 4, are activated by cylinders 38 to effect ejection of the formed core from the core or mold half 18b when it is in the pivoted position. Below the trajectory of mold half 18b is positioned a receiving surface or an endless belt 36 or conveyor supported by means not shown and driven by any suitable means well known in the art, also not shown.

Suitable hosings, couplings, hot gas supply conduits and other well known features of hot box core blowing machines have been purposely omitted as no novelty is claimed therein, except as specifically noted and those skilled in the art are well acquainted with these features and of molding apparatuses of the general type depicted herein.

Referring now to FIGURES 3 and 4, the mold half 18a may be secured to the burner platen 20 by bolts (not shown) through corresponding flange 40 on mold half 18a and flange 42 on burner platen 20. Burner platen 20 is secured to support plate 21. Correspondingly, mold half 18b is secured to burner platen 24 which in turn is secured, by bolting or otherwise, to support plate 23. The spaces 44 and 46 indicate areas into which hot gases or other heating medium are injected to effectively heat the mold halves 18a and 18b and thus the curable material contained within the cavity 48 formed by the two mold halves 18a and 18b. Obviously a number of cores may be molded at one time in which case a plurality of mold cavities are provided, as depicted in FIGURE 3. Mold half 18b has a number of through bores in each of which is disposed a spring loaded pin 50. Each pin 50 has a large shank end 50a and a head end 50b secured to the pin end by means of a retainer pin or other means. Spring 52 of heat resistant material provides a biasing force maintaining the end 50a in flush relationship with the interior surface of the mold half 18b. In practice the pins 50 may be positioned within the mold half and ground down in place to provide a smooth, flush fit. The number and location of the pins 50 will be dependent upon the particular contour of the mold cavity. A universal ejector plate 54 having a plurality of orifices 56, similar to those of burner platen 20, is disposed in burner platen chamber 46 secured at its outer ends to end plates 58 upon which piston rods 60 of cylinder 38 act. The orifices 56 allow for the heating medium to contact the exposed mold half surfaces. Preferably and desirably, the mold half 18b has a slight protrusion or extension 62 which will create sufficient draft to retain the formed core or article within mold half 18b when it moves away from mold half 18a. The number and placement of protrusion 62 will generally be dictated by the shape of the mold cavity and hence by the size and weight of the formed article or core. This is a well known practice in the molding art and will not be delved in further.

In will be noted that the plate 54 forms an integral, but removable, part of the burner platen assembly and thus it is not necessary to include this element as a part of the mold assembly. Thus, a variety of mold halves may be used in the apparatus without the need of providing an individual ejector plate. The configuration of the ejector pins, because of the large head 50b and the diameter of orifices 56 being less than the diameter of the head 50b, allows for effective engagement of plate 54 with the ejector pins 50 no matter where they are disposed in the movable mold half.

In brief the operation of the apparatus follows that normally found in the art in that a timed sequence of operations is maintained to deposit a charge of material from hopper 4 into charge cylinder 8 which moves to a point over the mold cavity 48 formed by the mold halves 18a and 18b coming together, and aligned with clamp cylinder 9. A charge of gas such as air blows the curable material into the mold cavity or cavities 48. A heated gaseous fluid or other heated medium is injected through the burner platens, via orifices 56, into the heating chambers 44 and 46. The mold halves 18a and 18b stay together for a sufficient length of time for the formation of a viable or workable core. The movable mold half 18b moves away from the stationary mold half 18a, and because of the protrusion or protrusions 62 within the cavity formed in mold half 18b, retains the core therein during the horizontal movement. The mold half 18b reches a preselected point away from the stationary mold half 18a to allow enough space for clear rotational movement of the mold half 18b with the retained formed core therein. The power cylinder 32 is thereafter actuated and piston rod 34 rotates mold half 18b downwardly through an arc of approximately 90 degrees. Thereupon, power cylinders 38 are actuated which causes piston rods 60 to move end plates 58, to which the ejector plate 54 is secured, to strike the heads 50b of ejector pins 50 to forceably eject the formed core onto a receiving surface or conveyor 36.

While each of the cylinders are air actuated by an automatic timing mechanism as is the conveyor, it is at once apparent that other mechanical linkages may be utilized in lieu of electrical devices to effect the timing desired. One attribute to having the conveyor time actuated rather than continuous runnning is that an end to end stack of cores is obtained and the period in between operation allows additional curing time for the formed cores. Of course, it is at once obvious that an additional curing time prior to handling could be obtained by utilizing a longer conveyor belt but this would add to the space necessary for the machine.

The means of accomplishing the timed sequence of operations are not alleged to be novel and are accomplieshed by means well known in the art. Consequently, no further discussion will be made concerning the obvious means and mode of accomplishing the timed sequence of charge, mold half moving and pivotal movement and ejection since these are matters which are well disclosed in the prior art.

From the foregoing it will be seen that for the first time an ejection plate utilized in molding systems has been disposed in conjunction with a burner platen rather than on a mold half itself and because of the construction of the ejector pins they may be placed any place in the mold and still be assured of proper contact thereby providing a universal ejector plate. Additionally, the method and apparatus hereinbefore disclosed provides for completely mechanized molding procedures not requiring physical manipulation of the formed cores and not necessitating core breakage due to haphazard ejection of the formed core from the mold cavity.

I claim:
1. In a molding apparatus the combination of
   (a) a first stationary mold half,
   (b) a second movable mold half reciprocably mounted for movement towards and away from said first mold half, said second mold half having means to effectuate retention of the formed article therein and being adapted for pivoted movement away from its line of travel at a point spaced from said first mold half and having means to eject said formed article at a predetermined time,
   (c) means to inject a hardenable material into the cavity formed by said mold halves when said halves are in closed position with a substantially vertical parting line,
   (d) means to move said second mold half and retained article away from said first mold half along a substantially horizontal path,
   (e) means to pivot said second mold half approximately 90 degrees to a point spaced above a receiving surface, and
   (f) means to eject said retained article onto said receiving surface.

2. The molding apparatus in accordance with claim 1 wherein said means to effectuate retention of said formed article in said second mold half comprises at least one protrusion means in the mold wall.

3. The molding apparatus in accordance with claim 2 wherein said means to pivot said second mold half comprises a piston arm adapted to rotate said second mold half through an angle of about 90° from horizontal.

4. The molding apparatus in accordance with claim 3 wherein said means to eject said formed article from said second mold half comprises spring loaded pins disposed through said second mold wall and actuated by a piston actuated plate.

5. The molding apparatus in accordance with claim 4 which additionally includes means to heat said hardenable material.

6. The molding apparatus in accordance with claim 5 wherein said piston actuated plate is apertured and is secured within the burner platen and each of said pins have one end flush with the interior wall of said second mold half and the other end flanged to be effectively engaged by said apertured plate.

7. The molding apparatus in accordance with claim 6 wherein said receiving surface is an endless conveyor.

8. The molding apparatus in accordance with claim 7 which additionally includes means to periodically actuate said pistons and conveyor.

9. In a molding apparatus the combination of a first mold half,
   a second pivotable mold half mounted for pivotable movement relative to said first mold half, said second mold half having means to effectuate retention of the formed article therein and having means to eject said formed article at a predetermined time,
   means to inject a hardenable material into the cavity formed by said mold halves when said halves are in closed position with a substantially vertical parting line,
   means to relatively translate said first and second mold halves along a generally horizontal path to separate same, means to pivot said second mold half approximately 90 degrees to a point spaced above a receiving surface, and means to eject said retained article onto said receiving surface.

10. The molding apparatus in accordance with claim 9 wherein said means to pivot said second mold half comprises a piston arm adapted to rotate said second mold half through an angle of about 90 degrees.

11. The molding apparatus in accordance with claim 9, wherein said means to inject a hardenable material includes a charge chamber, a curable material hopper, clamp means, means to reciprocate said charge chamber from a position beneath said hopper to a position beneath said clamp means, means to actuate said clamp means to move said charge chamber downwardly into engagement with the closed mold halves to receive curable material in the cavity formed therein, and means to blow the curable material downwardly from the charge chamber into the cavity.

References Cited

UNITED STATES PATENTS

| | | | |
|---|---|---|---|
| 2,733,489 | 2/1956 | Dahmer | 164—347 X |
| 3,089,205 | 5/1963 | Ellms | 164—183 |
| 3,137,905 | 6/1964 | Steinman et al. | 164—347 |
| 3,172,174 | 3/1965 | Johnson | 164—347 X |
| 3,348,606 | 10/1967 | Ptak et al. | 164—219 |

FOREIGN PATENTS 1,423,889  11/1965  France.

J. SPENCER OVERHOLSER, Primary Examiner

R. D. BALDWIN, Assistant Examiner

U.S. Cl. X.R.

164—186, 213, 403; 18—2